United States Patent
Berry et al.

(10) Patent No.: US 9,443,226 B2
(45) Date of Patent: Sep. 13, 2016

(54) ELECTRONIC ASSISTANT FOR MAKING PREDICTIONS BASED ON USER MESSAGES

(75) Inventors: Pauline M. Berry, Menlo Park, CA (US); Adam Cheyer, Oakland, CA (US); Melinda Gervasio, Mountain View, CA (US); Thierry Donneau-Golencer, Menlo Park, CA (US); Stephen Hardt, Redwood City, CA (US); Kenneth Nitz, Redwood City, CA (US); Bart Peintner, Palo Alto, CA (US); Leslie Pound, Sunnyvale, CA (US); Neil Yorke-Smith, Mountain View, CA (US)

(73) Assignee: SRI INTERNATIONAL, Menlo Park, CA (US)

(*) Notice: Subject to any disclaimer, the term of this patent is extended or adjusted under 35 U.S.C. 154(b) by 881 days.

(21) Appl. No.: 12/538,475

(22) Filed: Aug. 10, 2009

(65) Prior Publication Data
US 2010/0179961 A1 Jul. 15, 2010

Related U.S. Application Data

(60) Provisional application No. 61/144,117, filed on Jan. 12, 2009, provisional application No. 61/144,399, filed on Jan. 13, 2009, provisional application No. 61/162,161, filed on Mar. 20, 2009.

(51) Int. Cl.
*G06F 17/30* (2006.01)
*G06Q 10/10* (2012.01)

(52) U.S. Cl.
CPC ....... *G06Q 10/107* (2013.01); *G06F 17/30908* (2013.01)

(58) Field of Classification Search
USPC .................... 707/802, 769; 706/47; 709/206
See application file for complete search history.

(56) References Cited

U.S. PATENT DOCUMENTS

2003/0105589 A1* 6/2003 Liu .............. G06F 17/30017
702/1
2006/0010217 A1* 1/2006 Sood .............................. 709/206
2006/0015482 A1* 1/2006 Beyer ............... G06F 17/30067

(Continued)

OTHER PUBLICATIONS

ClearContext Corporate Blog, "ClearContext Launches Two New Products to Manage Email Overload," Mar. 22, 2006, San Francisco, CA, <http://blog.clearcontext.com/2006/03/clearcontext-launches-two-new-products-to-manage-email-overload.html>.
ClearContext Corporation, "ClearContext Inbox Manager™ for Microsoft Outlook®: Designing a More Effective Inbox," Mar. 2004, <http://www.clearcontext.com/resources/attachments/Designing_a_More_Effective_Inbox.pdf>.

(Continued)

*Primary Examiner* — Son T Hoang
(74) *Attorney, Agent, or Firm* — Barnes & Thornburg LLP

(57) ABSTRACT

The present invention relates to an electronic assistant. In one embodiment, a system for processing data on a computing device includes at least one extractor for extracting data from an email to produce extracted data, a user model for generating a high-level model of an email environment on the computing device, based on the extracted data, and at least one predictor for generating a prediction related to the email, based on the extracted data and on the high-level model. In another embodiment, a system for scheduling an event includes an extractor for extracting constraints from a request for the event, a user model for receiving and storing scheduling preferences from a user, and a predictor coupled to the extractor and to the user model, for generating a candidate schedule for the event in accordance with the constraints and the scheduling preferences.

3 Claims, 10 Drawing Sheets

(56) References Cited

U.S. PATENT DOCUMENTS

| | | | |
|---|---|---|---|
| 2006/0080335 A1* | 4/2006 | Freeborg | G06F 17/30743 |
| 2007/0106728 A1 | 5/2007 | Adams et al. | |
| 2009/0047648 A1* | 2/2009 | Ferreira | G09B 5/02 |
| | | | 434/323 |
| 2009/0106307 A1* | 4/2009 | Spivack | G06Q 30/02 |
| 2009/0235280 A1* | 9/2009 | Tannier et al. | 719/318 |
| 2010/0082583 A1* | 4/2010 | Chang | G06F 17/30997 |
| | | | 707/706 |
| 2010/0198931 A1* | 8/2010 | Pocklington et al. | 709/206 |
| 2011/0113109 A1* | 5/2011 | LeVasseur et al. | 709/206 |

OTHER PUBLICATIONS

Berry, Pauline M., et al., "Conflict Negotiation Among Personal Calendar Agents", 2006, AAMAS, pp. 1467-1468.

Culotta, Aron, et al., "Extracting Social Networks and Contact Information from Email and the Web", 2004, Computer Science Department Faculty Publication Series, Paper 33, University of Massachusetts-Amherst.

Sen, Sandip, et al., "On the Design of an Adaptive Meeting Scheduler", 1994, Proceedings of the 10th Conference on Artificial Intelligence for Applications.

* cited by examiner

|  | From | To | CC | Contains Attachment? | Contains Question? | Sender in Contacts? | User Replied? |
|---|---|---|---|---|---|---|---|
| Email1 | Jim | User | None | Yes | No | Yes | Yes |
| Email2 | Jim | Marie | User | No | Yes | Yes | No |
| Email3 | Jim | Adam | User | Yes | No | Yes | No |
| Email4 | Adam | Jim | User | No | Yes | Yes | Yes |
| Email5 | Adam | User | None | No | Yes | Yes | Yes |
| Email6 | Ken | Jim | None | Yes | Yes | No | No |

FIG. 3

|  | From | To | CC | Contains Attachment? | Contains Question? | Sender in Contacts? | Important? |
|---|---|---|---|---|---|---|---|
| Email 7 | Adam | Jim | User | No | Yes | Yes | Yes |
| Email 8 | Ken | User | None | Yes | Yes | No | Yes |

FIG. 4

| Digit position \ Digit value | 1 | 2 | 3 | 4 | 5 | 6 | 7 | 8 | 9 |
|---|---|---|---|---|---|---|---|---|---|
| 0 | Digit @ 0 | ( @ 0 | Upper case @ 0 | Upper case @ 0 and 1 | $ @ 0 | Digit @ 0; alpha @ 1 | # 0 | | |
| 3 | Len ≤ 1 | Len = 1 and == '&' | | | | | | | |
| 5 | 1= integer | | | | | | | | |
| 6 | . @ the end | : @ the end | M @ the end | Digit @ the end | ) @ the end | | | | |
| 7 | .inside | / anywhere | -' anywhere | . and - anywhere | | | | | |
| 8 | Length = 5 | Length =2 | Length = 8 | Length = 10 | Length = 12 | | | | |
| 9 | Alpha @ position 2 | Alpha @ positions 3 and 2 | | | | | | | |
| 11 | day | month | time | | | | | | |
| 12 | Digit @ 2 | M' @ 1 | Character @1; digit @ 0 | | | | | | |
| 13 | State | St/Ave/Blvd | Program | Job title | Company | Room, bldg | Honorific | Country | Descriptor |
| 14 | @ | http | xNUM | ® | | | | | |

FIG. 6

ELECTRONIC ASSISTANT FOR MAKING PREDICTIONS BASED ON USER MESSAGES

CROSS REFERENCE TO RELATED APPLICATIONS

This application claims the benefit of U.S. Provisional Patent Application No. 61/144,117, filed Jan. 12, 2009; U.S. Provisional Patent Application No. 61/144,399, filed Jan. 13, 2009; and U.S. Provisional Patent Application No. 61/162,161, filed Mar. 20, 2009, all of which are herein incorporated by reference in their entireties.

REFERENCE TO GOVERNMENT FUNDING

This invention was made with Government support under contract number NBCHD030010 awarded by the Department of Interior and contract number FA8750-07-D-0185 awarded by the United States Air Force. The Government has certain rights in this invention.

FIELD OF THE INVENTION

The present invention relates generally to data management, and relates more particularly to technology for assisting in data management.

BACKGROUND OF THE INVENTION

The ubiquity of electronic mail ("email") introduces many issues for email users. For example, for many busy professionals, the amount of email received can be overwhelming. Individuals often have a limited amount of time in which to read email, and therefore may not be able to read every email in their inboxes at a given time. Given such a limited amount of time, individuals will typically choose to read those emails that are the most important (e.g., emails that require a reply, or emails that pertain to a particular important subject or were sent by a particular person). Quickly determining which emails are the most important, however, is not an easy task.

Moreover, many incoming emails and other user-supplied information include information regarding upcoming tasks or events in which the individual is expected to participate (e.g., a meeting). The individual may forget, however, to enter these tasks or events in his or her scheduling application. Alternatively, the individual may wish to invite other individuals to participate in a task or event, but may not have enough knowledge of the other individuals' schedules to select an appropriate time for the task or event. Thus, the problem of scheduling a task or event in which several individuals are expected to participate is complicated by the fact that each of these individuals may have constraints on when, where, or how they will be available for participation.

In addition, if an individual is in a rush to send an outgoing email, he or she may forget to add a file attachment or a carbon copy ("CC") address to the outgoing email. This may result in the individual having to re-send the email, or in the email or file attachment not reaching the intended recipients.

SUMMARY OF THE INVENTION

The present invention relates to an electronic assistant. In one embodiment, a system for processing data on a computing device includes at least one extractor for extracting data from an email to produce extracted data, a user model for generating a high-level model of an email environment on the computing device, based on the extracted data, and at least one predictor for generating a prediction related to the email, based on the extracted data and on the high-level model. In another embodiment, a system for scheduling an event includes an extractor for extracting constraints from a request for the event, a user model for receiving and storing scheduling preferences from a user, and a predictor coupled to the extractor and to the user model, for generating a candidate schedule for the event in accordance with the constraints and the scheduling preferences.

BRIEF DESCRIPTION OF THE DRAWINGS

The teachings of the present invention can be readily understood by considering the following detailed description in conjunction with the accompanying drawings, in which:

FIG. 3 is a table illustrating an exemplary first set of incoming emails;

FIG. 4 is a table illustrating an exemplary second set of incoming emails;

FIG. 6 is a table illustrating some exemplary values of digits for word vectorization;

To facilitate understanding, identical reference numerals have been used, where possible, to designate identical elements that are common to the figures.

DETAILED DESCRIPTION

The present invention relates to an electronic assistant. The electronic assistant facilitates processing of data on a user's computing device (e.g., a desktop computer, a laptop computer, a personal digital assistant, a cellular telephone, a set top box, a gaming console, or the like). Embodiments of the invention perform a triage of a user's email inbox in order to determine a relative order in which the user's incoming emails should be read (i.e., the invention determines which emails are the most "important"). Further embodiments of the invention present a user interface that allows the user to quickly view only the "important" emails, without having to launch the email program. Thus, if the user is in a hurry, he or she can check the important emails without having to go through all of the unread emails. In a further embodiment still, the present invention checks the user's outgoing email to determine whether a file attachment or carbon copy ("CC") address is potentially missing from the email. In still further embodiments, the present invention populates the user's contacts and scheduling application by extracting information from incoming emails. Thus, email processing is streamlined for the user.

Figure 1:
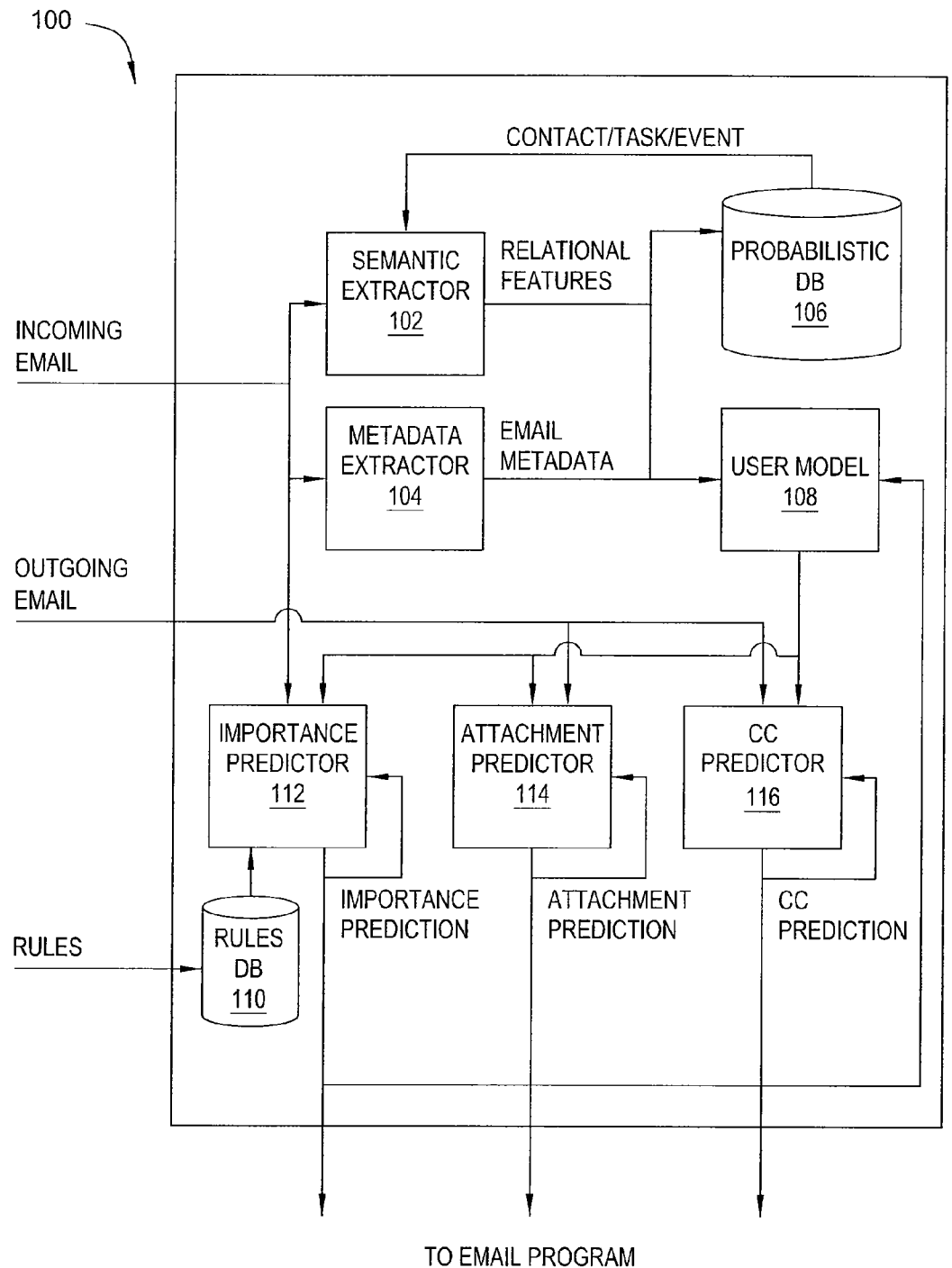
FIG. 1 is a block diagram illustrating one embodiment of an electronic assistant, according to the present invention.

FIG. 1 is a block diagram illustrating one embodiment of an electronic assistant 100, according to the present invention. As illustrated, the electronic assistant 100 receives as input a user's email and one or more rules to apply to the email. The electronic assistant 100 outputs a plurality of predictions relating to the importance of incoming email and whether an outgoing email should include a file attachment or a carbon copy address.

To this end, the electronic assistant 100 comprises a plurality of components or processors, including a semantic extractor 102, a metadata extractor 104, a probabilistic database 106, a user model 108, a rules database 110, and important predictor 112, an attachment predictor 114, and a CC predictor 116.

When the user's email program receives an incoming email, the electronic assistant 100 passes the incoming email to both the semantic extractor 102 and the metadata extractor 104. The semantic extractor 102 extracts relational and bag or word features from the incoming email, while the metadata extractor 104 extracts metadata (i.e., data about data, such as tags) from the incoming email.

In one embodiment, the bag of word features that are extracted by the semantic extractor 102 are extracted from a representation of the body and subject of the incoming email. For example, in one embodiment, the semantic extractor 102 performs content analysis on the incoming email to determine whether the incoming email contains a question. This content analysis may include examining the email body or subject for question marks or phrasing that indicates a question or request (e.g., subject-verb inversion, polite words such as "please"). In a further embodiment, other bag of word features that are extracted by the semantic extractor 102 include the length of the incoming email (e.g., number of words), the presence of specific keywords (e.g., "reply," "answer," "let me know . . . ," etc.). In a further embodiment still, the semantic extractor 102 analyzes content patterns that predict responses.

In one embodiment, the relational features that are extracted by the semantic extractor 102 from the incoming email are based on the user's relation with the sender and/or subject or the incoming email. Thus, in one embodiment, the relational features extracted by the semantic extractor 102 include the incoming email's sender, main recipients, carbon copy recipients, email addresses, Internet domains, and file attachments. In a further embodiment, the semantic extractor 102 observes whether the user responds to the incoming email and how long the user takes to respond.

The relational and bag of word features extracted by the semantic extractor 102 and the metadata extracted by the metadata extractor 104 are output to the user model 108. Based on the received features, the user model 108 updates a high-level model of the user's email environment, containing information such as: the total numbers of emails received from and sent to a particular correspondent, which correspondents the user is most responsive to, and whether the user frequently replies to email sent by correspondents who are in the user's contacts (e.g., electronic address book). Thus, the relational and bag of word features extracted by the semantic extractor 102 and the metadata extracted by the metadata extractor 104 can be considered as training data for the user model 108.

The user model 108 develops a set of queries that help the electronic assistant 100 to identify patterns of user behavior within the user's email environment. For instance, these queries may include: "Is the sender [of the incoming email] in the user's contacts?"; "Does the user usually reply to the sender?"; "Does the user usually reply to emails when he or she is CC'd?"; "Does the user usually reply to emails that contain file attachments?"; and "Does the user usually reply to emails tagged with a certain tag?" Such queries can be very informative, since they are built on a very specific user model 108 and capture high-level patterns that can be generalized to new contacts and similar emails.

The output of the semantic extractor 102 is also provided to a probabilistic database 106. The probabilistic database 106 uses the relational features extracted by the semantic extractor 102 to build a set of contacts, tasks, and events associated with the user's email environment. The probabilistic database 106 then provides this information back to the semantic extractor 102 via a feedback loop.

As discussed above, the second input to the electronic assistant 100 is a set of rules. When the electronic assistant 100 receives a rule, the rule is stored in a rules database 110. The rules stored in the rules database 110 are queries that help the electronic assistant 100 to determine when an incoming email should be identified as important. For example, a rule may dictate that "Emails from Thierry about Project XYZ sent in the past week should be identified as important."

The rules are based on at least one of email metadata and email content. In one embodiment, the rules are user-defined. In a further embodiment, the rules are defined in natural language through a natural language user interface. Thus, a large number of naturally expressed terms and phrases (e.g., "attachment," "contact," "email," "file," "presentation," "meeting," "slide," etc.), as well as many common operating system and/or software program terms (e.g., ".doc," "html," ".xls," etc.) can be used to specify the rules.

The importance predictor 112 receives incoming emails, the user model 108, and the rules stored in the rules database 110, and generates a prediction of the importance of an incoming email based on the received information. In one embodiment, the importance predictor 112 includes a logic regression classifier that learns how to classify incoming emails as important or not important based on implicit (e.g., user model) and explicit (e.g., rules, user corrections to classifications) feedback. In one embodiment, the importance predictor 112 also employs a natural language engine for parsing and understanding to build a library query (e.g., a LUCENE information retrieval library) for each rule in the rules database 110. When run against a library full text query over the user model 108 and the incoming email, the importance predictor 112 returns (e.g., at regular intervals) all emails matching the library query.

In one embodiment, the importance predictor 112 dynamically re-interprets time-based rules (e.g., "email received today") at regular configurable intervals. For example, based on the current time, the natural language engine provides an up-to-date interpretation of the rule. If the interpretation has changed, an updated library query is built to account for the new time requirements. Running the new library query over the user model and incoming email will then return an updated set of "important" emails. For instance, on Oct. 15, 2008, the rule "email received today" will be received as "email received 15 Oct. 08 12:00 AM-15

Oct. 08 11:59 PM," and a first set of emails will be returned. In the first hour of Oct. 16, 2008, the rule will be re-interpreted as "email received 16 Oct. 08 12:00 AM-16 Oct. 08 11:59 PM," and a second set of emails will be returned.

The output of the importance predictor 112 (i.e., importance predictions regarding incoming emails) is provided to the user's email program and to the user model 108. The email program uses this information to determine which emails to display to the user in a quick view display, described in further detail below. The user model 108 uses this information as training information that can be used to refine the user model 108. In one embodiment, the user model 108 further accounts for user corrections to the output of the importance predictor 112 (e.g., the user marks an email as "unimportant," where the importance predictor 112 predicted that the email was "important"). In a further embodiment, the importance predictor is configured as a spam filter that classifies an email as "spam" or "not spam."

The attachment predictor 114 receives outgoing emails and the user model 108, and generates a prediction as to whether the outgoing email should include a file attachment, based on the received information. In one embodiment, the attachment predictor 114 bases the prediction on the relational features of the outgoing email, on bag of words features of the body and subject of the outgoing email (e.g., the contents of the outgoing email are analyzed before sending), and/or on the sender and recipients of the outgoing email. In one embodiment, the operations of the attachment predictor 114 are more content-based than the operations of the importance predictor 112. For example, the detection of specific words (e.g., "attach," "attachment," etc.), as well as the positions of those words in the outgoing email and their surrounding words, can indicate whether the outgoing email should include a file attachment. In a further embodiment, the user model 108 includes relational features that aid in predicting whether outgoing emails should include file attachments (e.g., "percentage of emails sent by the user that included file attachments"). In one embodiment, the underlying learning model used by the attachment predictor 114 is based on a logic regression classifier that uses implicit and explicit feedback to refine its weights and user model 108 over time. Explicit feedback may comprise, for example, the user not including a file attachment address where one is predicted.

The CC predictor 116 receives outgoing emails and the user model 108, and generates a prediction as to whether the outgoing email should include a carbon copy address, based on the received information. In one embodiment, the CC predictor 116 bases the prediction on the relational features of the outgoing email, on bag of words features of the body and subject of the outgoing email (e.g., the contents of the outgoing email are analyzed before sending), and/or on the sender and recipients of the outgoing email. Content analysis techniques are used to determine whether additional recipients should be carbon copied on an outgoing email, as well as who those additional recipients should be. In a further embodiment, the user model 108 includes relational features that aid in predicting whether outgoing emails should include carbon copy address (e.g., "percentage of emails sent to the user that were also sent to other recipients"). In one embodiment, the underlying learning model used by the CC predictor 116 is based on a logic regression classifier that uses implicit and explicit feedback to refine its weights and user model 108 over time. Explicit feedback may comprise, for example, the user not including a carbon copy address where one is predicted.

Figure 2:
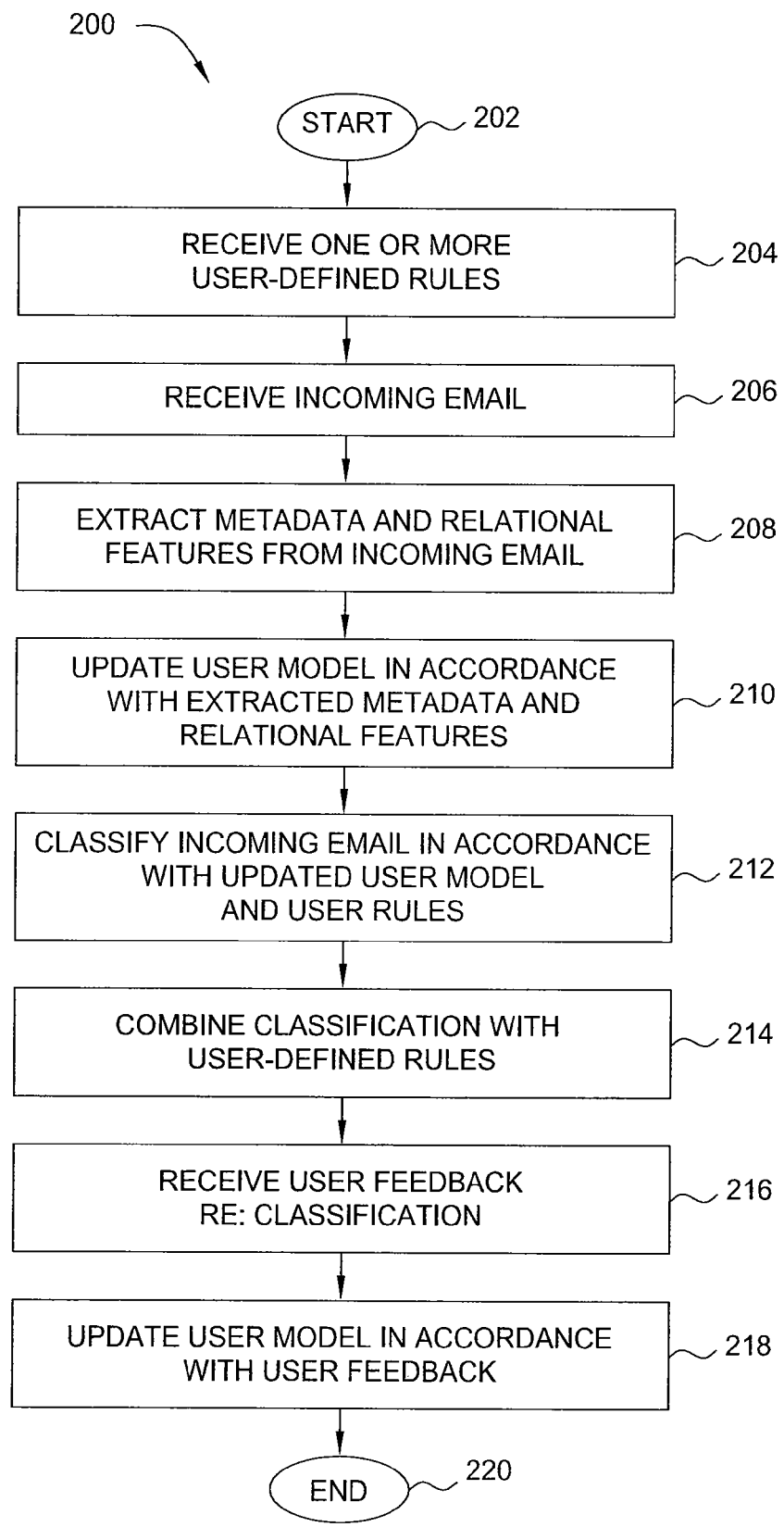
FIG. 2 is a flow diagram illustrating a first embodiment of a method for processing an incoming email, according to the present invention.

FIG. 2 is a flow diagram illustrating a first embodiment of a method 200 for processing an incoming email, according to the present invention. Specifically, the method 200 is implemented in order to classify incoming email so that the incoming email can be triaged according to importance. The method 200 may be implemented, for example, by the electronic assistant 100 illustrated in FIG. 1. As such, reference is made in the discussion of FIG. 2 to various components of the electronic assistant 100; however, the method 200 is not limited to operation with a device configured in the manner illustrated in FIG. 1.

The method 200 is initialized in step 202 and proceeds to optional step 204 (illustrated in phantom), where the electronic assistant 100 receives one or more user-defined rules for guiding classification of incoming emails.

In step 206, the electronic assistant 100 receives an incoming email. In one embodiment, the incoming email e is represented as a sparse binary feature vector $e \in \{0, 1\}^D$. Every dimension $d \in D$ is a task-specific feature of the incoming email e. Real valued features are discretized into binary features.

In step 208, the semantic extractor 102 and the metadata extractor 104 extract relational features and metadata from the incoming email. The user model 108 then updates the user's email environment in accordance with the extracted relational features and metadata in step 210.

In step 212, the importance predictor 112 classifies the incoming email based on the updated user model 108 and the features of the incoming email. In one embodiment, the importance predictor 112 classifies the incoming email in accordance with a binary classification system that assigns either a positive or negative label to the incoming email (e.g., "important" or "not important").

In optional step 214 (illustrated in phantom), the importance predictor 112 combines the classification generated in step 212 with the user defined rules that were optionally provided in step 204. In one embodiment, this combination is performed in accordance with a weighted probabilistic model, where the user defined rules are weighted highly relative to the classification. In a further embodiment, the weights of the classification and the user-defined rules are updated as the electronic assistant receives implicit and explicit user feedback.

Consider, for instance, the example illustrated in FIG. 3, which is a table illustrating an exemplary first set of incoming emails (i.e., Email1-Email6). As a further example, suppose the user has provided the following rule: $r_1$="emails from Ken are important." Further still, suppose that the importance predictor 112 considers only the following set of features, and that all of the features are assigned the same weight, $w_p=1$: is the sender in the user's contacts or address book (relational feature), does the user normally reply to emails on which he/she is CC'd (relational feature), does the user normally reply to emails that contain attachments (relational feature), and does the email contain a question (content analysis feature).

As a further example, supposed that the emails illustrated in FIG. 4 are received. FIG. 4 is a table illustrating an exemplary second set of incoming emails Email7 and Email8). Further suppose that the only user-defined rule is $r_1$ (defined as above) and that the weight of user-defined rules is $w_u=3$.

Email7 is from Adam. The user replies one hundred percent of the time when the sender is Adam. Furthermore, Adam is in the user's contacts, and the user replies sixty percent of the time when the sender is in the contacts. In addition, the user is CC'd on Email7, and the user replies thirty-three percent of the time when he or she is CC'd. Email7 contains a question, and the user replies fifty percent of the time when the email contains a question. All weights being equal, Email7 would therefore be classified by the importance predictor 112 as "important" based on the exemplary features (based on two positive signals, one negative signal, and one neutral signal, where a fifty percent reply frequency is considered neutral, anything below fifty percent is considered negative, and anything above fifty percent is considered positive).

Email8 is from Ken. The user never replies (zero percent) when the sender is Ken. Furthermore, Ken is not in the user's contacts. In addition, Email8 contains an attachment, and the user replies sixty-six percent of the time when the email contains an attachment. Email8 contains a question, and the user replies fifty percent of the time when the email contains a question. All weights being equal, Email8 would therefore be classified by the importance predictor 112 as "not important" based on the exemplary features (based on two negative signals, one positive signal, and one neutral signal). The user-defined rule $r_1$ ("emails from Ken are important) adds a positive signal, however, and is weighted more highly than the other criteria ($w_u=3$), so the final classification of Email8 would be "important."

In step 216, the importance predictor 112 receives user feedback related to the classifications generated in steps 212 and 214. In one embodiment, the user feedback is implicit (e.g., whether or not the user actually replies to Email7 or Email8), explicit (e.g., the user manually corrects the classifications generated in steps 212 and 214), or both.

In step 218, the user model 108 updates the user's email environment in accordance with the user feedback. In one embodiment, explicit feedback is weighted more highly than implicit feedback in this updating step. For example, if the user does not reply to Email7, the weights of the "contains question" and "sender in contacts" features will be lowered, and the information regarding Email7 (including the user feedback) will included in the user model 108 as a new training example. Similarly, if the user does not reply to Email8, the weight of the user-defined rule $r_1$ will be decreased and the user model 108 will be further refined.

The method 200 terminates in step 220.

In one embodiment, the electronic assistant 100 may also be implemented to automatically create and populate events, tasks, and contacts for a user, based on the user's incoming email.

Figure 5:
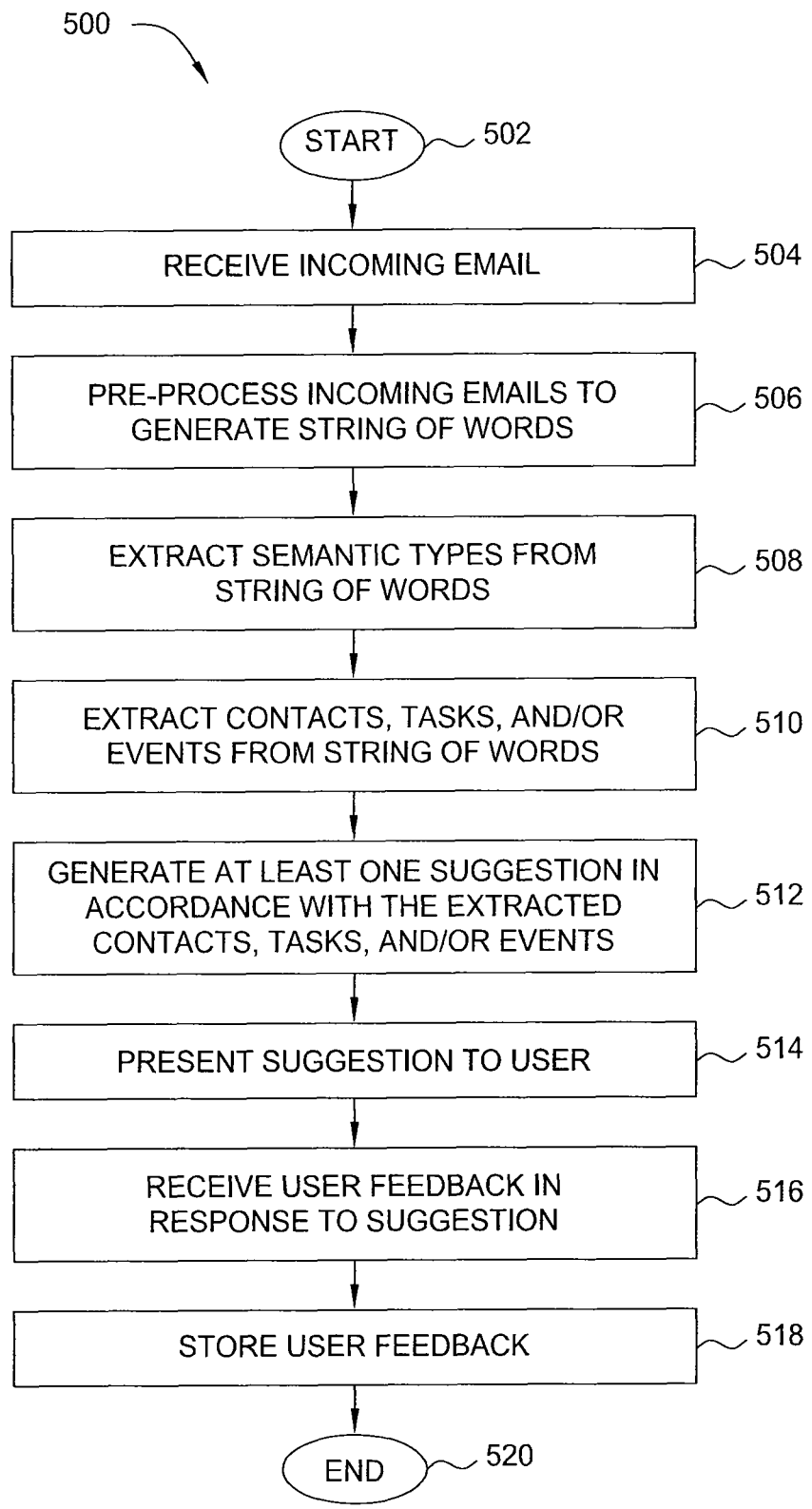
FIG. 5 is a flow diagram illustrating a second embodiment of a method for processing an incoming email, according to the present invention.

FIG. 5 is a flow diagram illustrating a second embodiment of a method 500 for processing an incoming email, according to the present invention. Specifically, the method 500 is implemented in order to create events, tasks, and contacts based on incoming email. The method 500 may be implemented, for example, by the electronic assistant 100 illustrated in FIG. 1. As such, reference is made in the discussion of FIG. 5 to various components of the electronic assistant 100; however, the method 500 is not limited to operation with a device configured in the manner illustrated in FIG. 1.

The method 500 is initialized at step 502 and proceeds to step 504, where the electronic assistant 100 receives an incoming email.

In step 506, the semantic extractor 102 pre-processes the incoming email in order to facilitate later extraction of semantic types. In one embodiment, this pre-processing comprises representing the incoming email as a string of words, truncated at a certain or specified length. In a further embodiment, the string of words is broken into an array of separate words, where character positions are saved and stop words are nulled out. In one embodiment, punctuation and hypertext markup language (HTML) or other executable code is removed from the incoming email.

In step 508, the semantic extractor 102 extracts semantic types from the string of words. This aids in finding patterns in the incoming email. In one embodiment, the semantic extractor 102 finds patterns in at least one of two ways: through regular expressions and through word and sentence vectorization.

Pattern identification through regular expressions allows one to extract specific patterns from a text string. Regular expressions are generalized searches over text. For example, the regular expression "emailFrom" can be used as follows: (\b[Ff]rom:\b)(\\w+)@(\\w+\\.)(\\w+)(\\.\\w+)*. Matching data is extracted in step 508 by the semantic extractor. In one embodiment, the semantic extractor 102 is pre-programmed with a plurality of regular expressions. In a further embodiment, the semantic extractor 102 is taught by the user to find additional regular expressions.

Pattern identification through word vectorization vectorizes words from the pre-processed word array (generated in step 506) into a fifteen-digit vector (e.g., 001000002000070). Each digit of the vector corresponds to some characteristic of the given word.

FIG. 6, for example, is a table illustrating some exemplary values of digits for word vectorization. The columns of the table represent digit values, while the rows of the table represent digit positions. Rows (positions) 1, 2, 4, 10, and 11 are free. Row (position) 13 contains lookups in tables that can be learned by the semantic extractor 102 from user input, such as "countries" (e.g., "Italy") and "descriptors" (e.g., "email"). More learning occurs when a user enters a word such as "France" and specifies it as a country. The semantic extractor 102 in this case will add the word "France" to a list of countries and then create a vector. If the vector is different from the vectors in memory, a new listing is created. The new listing is for the vector equivalent of "France" rather than for "France" itself. Thus, the semantic extractor 102 generalizes the learning over many countries. The same procedure can be performed for web sites, email addresses, honorifics, and various other types of information.

Sometimes, combinations of words have specific meanings or implications. An example of this is a street address (e.g., 124 Dog Avenue). The semantic extractor 102 can learn such a combination of words and generalize it from user interaction. For instance, if the user enters the combination of words "123 Dog Avenue" and identifies the combination as a street address, the semantic extractor 102 may vectorize the individual words as follows:

100001000000100=number
300000000000000=capitalized word
300000110000020=street

These individual vectors are then combined into a "phrase vector" with a type of "street address." The phrase vector is then saved for future use.

In one embodiment, the semantic extractor 102 is pre-programmed with a plurality of known phrase vector examples (e.g., street address, stet, phone, time, date, etc.). The semantic extractor 102 searches through the text of an incoming email and compares the phrase vectors to known phrase vectors, adding up words to a maximum before moving on to the next word.

In step 510, the semantic extractor 102 extracts contacts, tasks, and/or events from the string or words. In one embodiment, contacts are extracted by detecting capitalized words in the text of the incoming email and checking the capitalized words for acronyms. If multiple consecutive capitalized words are detected (e.g., up to three words, including initials), the multiple consecutive capitalized words are subjected to further processing, for example using a human name recognition processor (not shown) that compares the multiple consecutive capitalized words to a list of human names. In one embodiment, the list of human names can be trained or supplemented, for example to include regional names. If a threshold amount of the multiple consecutive capitalized words matches a human name, the semantic extractor 102 determines that the multiple consecutive capitalized words comprise a human name. The matching human name, as well as its position in the text of the incoming email, are then stored in the probabilistic database 106.

In one embodiment, once the multiple consecutive capitalized words are identified as the name of a person, the semantic extractor 102 examines the text of the incoming email for a corresponding job title. In one embodiment, the semantic extractor 102 examines a number of words occurring before and after the name. In one embodiment, the semantic extractor 102 looks for known job titles (stored and/or learned), "ist" job titles (e.g., physicist, chemist, etc.), job location (e.g., "at the University of Maryland"), or a combination thereof.

On the other hand, if a threshold amount of the multiple consecutive capitalized words do not match a human name, the semantic extractor 102 compares the multiple consecutive capitalized words to one or more other lists, including a list of organizations and organization types (e.g., including "Co.," "Inc.," or the like in the names). Name, job title, and organization information may be found, for example, in the signature of an email. In one embodiment, the method 500 may supplement this information with information from external sources (e.g., by performing an Internet search on a name detected in the incoming email).

In one embodiment, tasks, and events are extracted by detecting actions verbs and dates in the text of the incoming email. In one embodiment, the semantic extractor 102 examines the text of the incoming email for specific words that indicate an action (e.g., "call," "meet," "talk," "see," "meeting," "phone," or the like). Once such an action word has been detected, the semantic extractor 102 examines a number of words occurring before and after the action word in order to detect people associated with the indicated action (e.g., "Bob called Joe"). In a further embodiment, the semantic extractor 102 examines the number of words occurring before and after the action word in order to detect dates and times associated with the indicated action. Potential tasks and events can then be constructed from a combination of the extracted information (i.e., actions, people, dates, and times).

In step 512, the semantic extractor 102 generates at least one suggestion in accordance with the contacts, tasks, and events that have been extracted. In one embodiment, the suggestion takes the form of a new entry into the user's electronic contacts or scheduling application. The semantic extractor then presents the suggestion to the user in step 514.

In step 516, the semantic extractor receives feedback from the user in response to the suggestion. In one embodiment, the feedback comprises the user either accepting the suggestion (e.g., by saving the suggestion) or rejecting the suggestion (e.g., by cancelling the suggestion). In a further embodiment, the user makes one or more modifications to the suggestion before accepting it.

In step 518, the semantic extractor stores the user feedback for future reference in making suggestions. The method 500 then terminates in step 520.

As discussed above, the semantic extractor 102 can learn combinations of words, job titles, and other information that aids in processing an incoming email. In one embodiment, the semantic extractor employs at least one of the following types of learning: specific learning from examples, semi-generalized learning from examples, generalizing learning from examples, and learning through discovery.

In accordance with specific learning, the semantic extractor 102 learns from an example to find that specific example string in the text of an incoming email. For example, the semantic extractor 102 may search for a specific name or place that the user wants to know about. In accordance with semi-generalized learning, the semantic extractor 102 combines a new example with other known learned information to find "mixed" information. For example, the user may specify that "Truth or Consequences" is a town in New Mexico, thereby making this string a place name. From this point on, "Truth or Consequences" will be considered by the semantic extractor 102 as a possible town, when beforehand the string may have been found as capitalized words only (but with no other classification since it was not a known name).

In accordance with generalizing learning, the semantic extractor 102 learns from an example and generalizes it to find examples in the text of the incoming email. For example, the semantic extractor 102 may receive as an input a specifically formatted latitude/longitude coordinate. The semantic extractor 102 will then break each "word" of the coordinate into a fifteen-digit vector and combine the vector with the other "words" in the coordinate "phrase," thereby producing a phrase vector that is now generalized. The semantic extractor 102 would then be able to find any latitude/longitude coordinate of the same format.

In accordance with learning through discovery, the semantic extractor 102 finds acronyms and discovers their meanings. In one embodiment, the semantic extractor does this by finding non-numeric words (which may contain some numbers, but are not entirely composed of numbers) of all capitalized letters, for example by performing a string comparison of the word with the word converted to upper case. Once such a word is located, the semantic extractor 102 searches for a descriptor or definition of the acronym, which sometimes will go along with it and is often surrounded by parentheses (e.g., "ET (Eastern Time," or "Mountain Time (MT)"). These "learn-as-you-go" definitions are stored (e.g., in memory and/or on disk) and can be requested by the user.

The semantic extractor 102 can also use learning through discovery to find and link to people's names, phone numbers, and addresses. In one embodiment, this information is presented to the user for further processing or examination. In a further embodiment, the semantic extractor 102 also stores the information to assist with future analyses (e.g., to notify of changes of address).

In one embodiment, the method 500 is performed automatically for all incoming emails. In another embodiment, the user may "opt in" to the method 500 by specifying incoming emails that he or she wishes to be processed. For example, the user may "drag and drop" an email from his or her inbox to an application that performs processing in accordance with the method 500.

Figure 7:
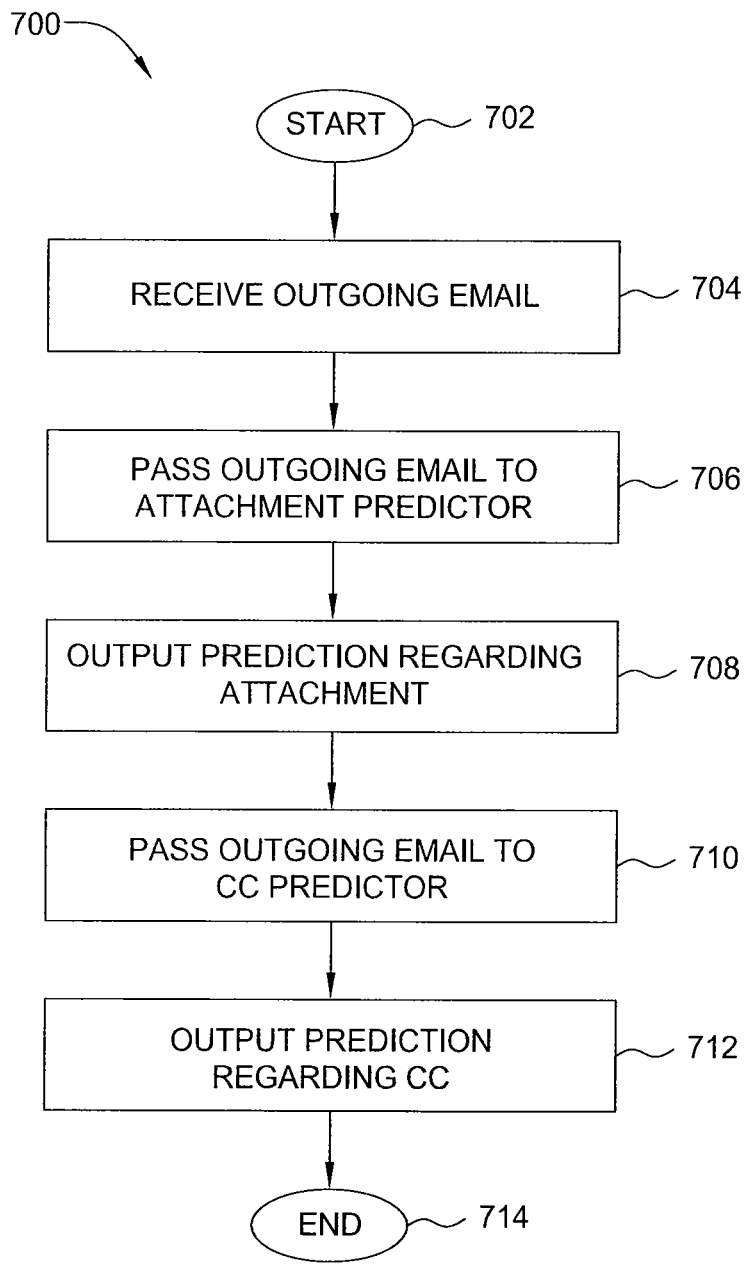
FIG. 7 is a flow diagram illustrating one embodiment of a method for processing an outgoing email, according to the present invention.

FIG. 7 is a flow diagram illustrating one embodiment of a method 700 for processing an outgoing email, according to the present invention. Specifically, the method 700 is implemented in order to process an email about to be sent by a user to one or more recipients. The method 700 may be implemented, for example, by the electronic assistant 100 illustrated in FIG. 1. As such, reference is made in the discussion of FIG. 7 to various components of the electronic assistant 100; however, the method 700 is not limited to operation with a device configured in the manner illustrated in FIG. 1.

The method 700 is initialized at step 702 and proceeds to step 704, where the electronic assistant 700 receives an outgoing email. In one embodiment, the outgoing email is represented as a sparse binary feature vector. In one embodiment, the features of the vector include at least one of: relational features, features extracted from bag of words representations of the email subject and body, the sender of the email, or the recipient(s) of the email.

In step 706, the outgoing email passes to the attachment predictor 114. The attachment predictor 114 processes the outgoing email and outputs a prediction as to whether the outgoing email is missing an attachment in step 708. In one embodiment, the prediction is either a positive label (e.g., "attachment missing") or a negative label (e.g., "no missing attachment").

In step 710, the outgoing email passes to the CC predictor 116. The CC predictor 116 processes the outgoing email and outputs a prediction as to whether the outgoing email is missing a carbon copy address in step 712. In one embodiment, the prediction is either a positive label (e.g., "missing person to CC") or a negative label (e.g., "no missing person to CC").

The method 700 then terminates in step 714. In one embodiment, steps 706-708 are performed in parallel with steps 710-712 (i.e., predictions regarding attachments and carbon copy addresses are generated substantially simultaneously). In another embodiment, steps 706-708 and steps 710-712 are performed serially (i.e., predictions regarding attachments are generated before predictions regarding carbon copy addresses, or vice versa).

In a further embodiment, the method 700 checks the outgoing email for dates, for example to verify that dates contained in the outgoing email are correct. For instance, the user may have specified a day or the week and a date that do not match (e.g., the user may have specified "Sunday, Jan. 12, 2009," when Jan. 12, 2009 actually occurred on a Monday).

As discussed above, the electronic assistant 100 of the present invention may, in some cases, generate or suggest tasks or events as entries into a user's electronic scheduling application, based on the contents of an incoming email. However, it is often the case that a task or event implied in an incoming email may not have a hard date or time set (e.g., the email may request that arrangements be made for the task or event), or that a date or time specified in the email may not fit in the user's schedule. In other words, the electronic assistant 100 must consider a variety of factors in suggesting the entry, including, but not limited to, one or more of the following: a set of desired constraints on event time, a set of required and optional participants, a set of possible locations, the existing schedules for each participant (i.e., prior commitments), a preference model that indicates the relative importance of each type of constraint (e.g., participant constraint versus event time constraint), or available preference models for the day and time preferences of each participant.

Figure 8:
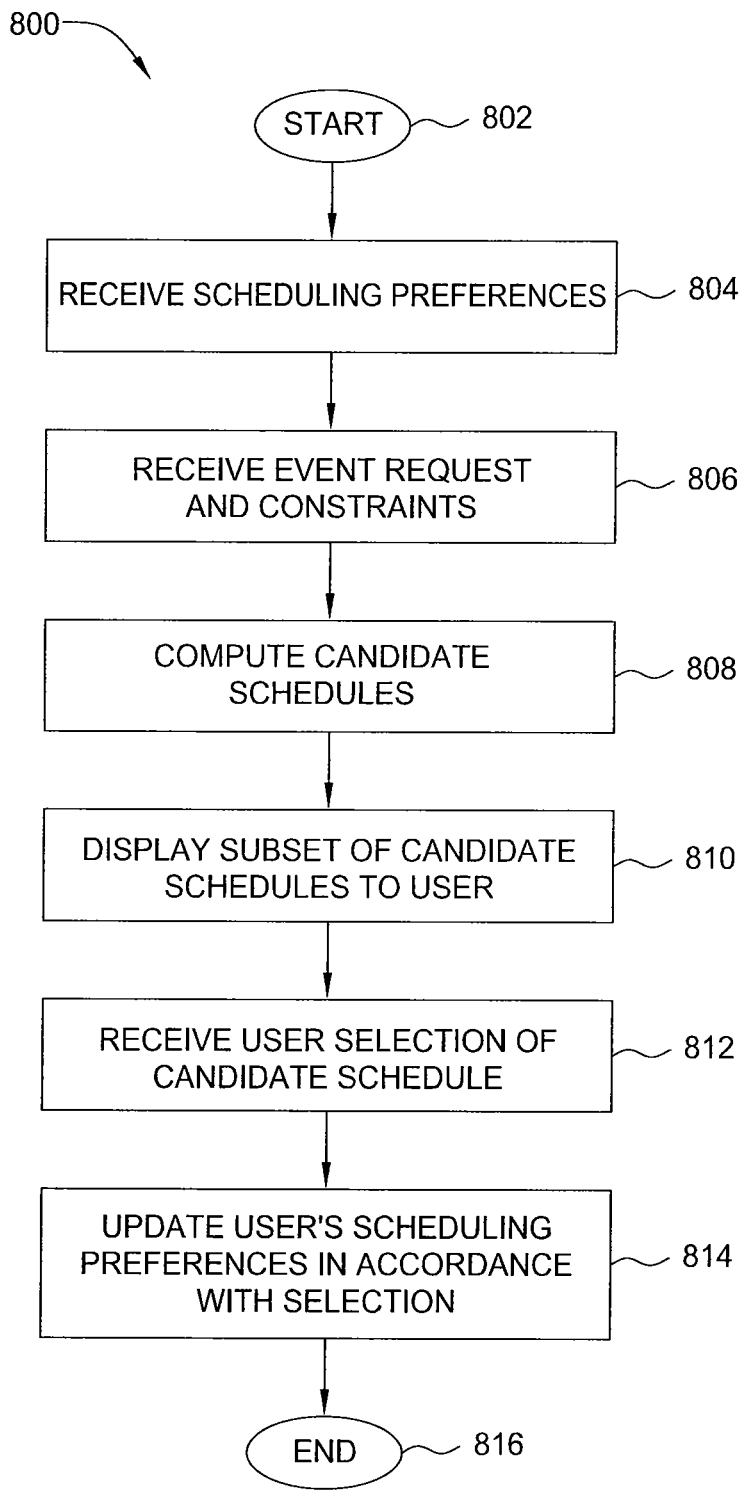
FIG. 8 is a flow diagram illustrating one embodiment of a method for generating a suggestion for a task or event, according to the present invention.

FIG. 8 is a flow diagram illustrating one embodiment of a method 800 for generating a suggestion for a task or event, according to the present invention. Specifically, the method 800 is implemented in order to find an optimal solution in the context of event or task scheduling. The method 800 may be implemented, for example, by the electronic assistant 100 illustrated in FIG. 1. As such, reference is made in the discussion of FIG. 8 to various components of the electronic assistant 100; however, the method 800 is not limited to operation with a device configured in the manner illustrated in FIG. 1.

The method 800 is initialized in 802 and proceeds to step 804, where the electronic assistant 100 (e.g., the user model 108) receives scheduling preferences from the user. In one embodiment, the electronic assistant 100 additionally receives scheduling preferences from one or more other individuals (e.g., other potential participants in the event or task to be scheduled).

In step 806, the electronic assistant 100 receives an event request and a set of desired constraints on the event time. In one embodiment, the constraints include at least one of: a set of desired constraints on event time, a set of required and optional participants, a set of possible locations, the existing schedules for each participant (i.e., prior commitments), a preference model that indicates the relative importance of each type of constraint, or available preference models for the day and time preferences of each participant. In one embodiment, at least one of the event request and the constraints is extracted from an incoming email, as discussed above. For example, the user may have received an email requesting that a meeting be scheduled on Friday afternoon. The constraints may be extracted from emails or may be supplied directly by the user.

In step 808, the electronic assistant 100 computes one or more candidate schedules in response to the event request, taking into account the event request, the constraints, and the scheduling preferences. The electronic assistant then displays a subset (e.g., all or less than all) of the candidate schedules to the user in step 810.

In step 812, the electronic assistant 100 receives a user selection of one of the candidate schedules in response to the displaying of the subset. The electronic assistant 100 then updates the user's scheduling preferences in accordance with the selection in step 814 before terminating in step 816.

In one embodiment, steps 808-812 may be repeated a number of times until a candidate schedule is found that satisfies the user. The updated scheduling preferences become the basis of reasoning over candidate schedules for the next event request. In one embodiment, the method 800 converts the constraint information into a flexible model comprising disjunctive temporal constraints with preferences, soft constraints over discrete variables, and a utility function. The preference functions on the temporal and discrete constraints can be any function over two variables, as long as the function can be queried for the maximum and minimum values given one or both of the variables. In one embodiment, the preference functions include at least one of the following types: step, piece-wise linear, and Gaussian.

In one embodiment, candidate schedules are computed in accordance with step 808 by discretizing all continuous variables (e.g., time variables) and performing a standard constraint satisfaction problem (CSP) search over the variables. The efficiency of the search is improved through a variable ordering and value ordering technique that takes advantage of the semantics of the variables and the constraints through a tagging mechanism.

In one embodiment, each variable and each constraint is given a tag. A "tag" within the context of this embodiment is a number, but is represented as a string to simplify specification. The tags are used to inform the search as to which variables and which constraints have common intent and purpose. In typical scheduling problems, not all soft constraints figure equally into the search for an optimal solution; some variables almost always retain a certain value. Other variables vary widely in the set of best solutions. If these factors are accounted for, a variable ordering that places the "rarely" changing variables first will tend to identify the set of optimal solutions (e.g., the candidate schedules) more quickly than alternative variable ordering techniques.

In one embodiment, given the set of tags, the method 800 learns the best ordering through trial and error. As candidate schedules are found, each candidate schedule is analyzed to determine the properties of each variable and constraint across the solution set. These properties are used to set the ordering in future problems. In one embodiment, the ordering of the tags is manually learned. In another embodiment, the method 800 learns the ordering of the tags automatically through execution.

Moreover, it is noted that the electronic assistant 100 may obtain one or more of the constraints and user preferences from one or more of: email message extractors, the user, and other users. The user may provide constraints and preferences using one or more of: a natural language interface, a form-based interface, a responsive dialog interface, or a graphical calendar interface. Other users may provide constraints and preferences through communication between instances of the electronic assistant 100.

In further embodiments of the present invention, the electronic assistant 100 is configured to perform tagging of items on the user's computer. Within this context, "tags" are terms assigned to an item (e.g., a file on the user's computer). Tags are often descriptive and can be considered as metadata that describes the item and allows for quick retrieval of the item through a search on the metadata. Typically, tags are chosen by the user, who manually associates them with items. Thus, tagging creates a burden for the user. Moreover, the subjective nature of tagging often results in little or no meaning or semantics for the tags.

Embodiments of the electronic assistant 100 allow the user to specify natural language descriptions that can be associated with a tag. These descriptions are queries that can be stipulated through a natural language interface. The descriptions can be based on the metadata and/or the content of any item known to the electronic assistant 100. For example, the descriptions could state "Email from Thierry about Project XYZ sent in the past week" or "Files modified last week."

A large number of naturally expressed terms and phrases (e.g., "attachment," "contact," "email," "file," "presentation," "meeting," "slide," etc.), as well as many common operating system items (e.g., "doc," "html," "xls," etc.) can be used to specify the queries.

In one embodiment, tags in accordance with the present invention rely on harvested data. In one embodiment, harvested data includes at least one of: email in user-specified folders, files of various types (pdf, doc, html, etc.) in user-specified directories (including shared drives), calendar events, or contacts, among other types of data. As new incoming emails are received and as files are modified, the new emails and modified files are re-harvested so that the harvested data is up to date.

Figure 9:
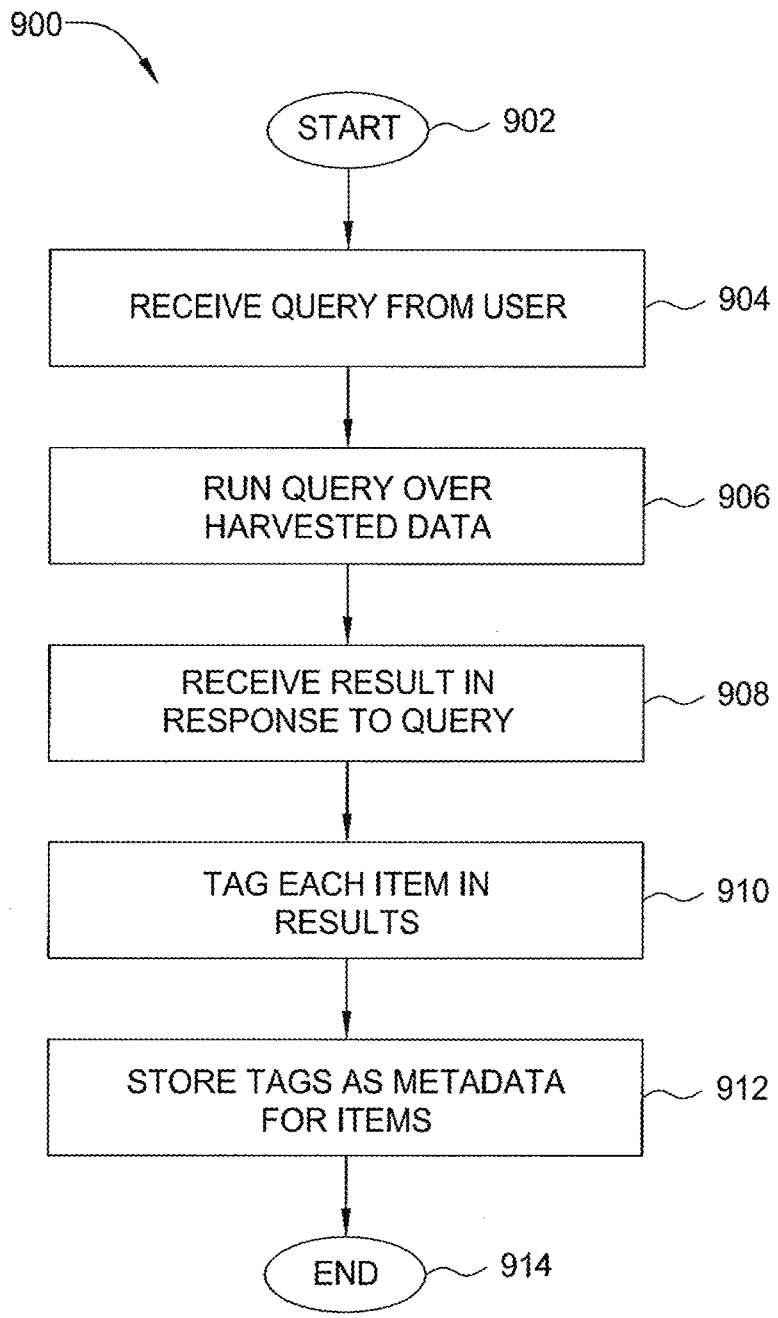
FIG. 9 is a flow diagram illustrating one embodiment of a method for automatically tagging items on a user's computer, according to the present invention.

FIG. 9 is a flow diagram illustrating one embodiment of a method 900 for automatically tagging items on a user's computer, according to the present invention. The method 900 may be implemented, for example, by the electronic assistant 100 illustrated in FIG. 1. As such, reference is made in the discussion of FIG. 9 to various components of the electronic assistant 100; however, the method 900 is not limited to operation with a device configured in the manner illustrated in FIG. 1.

The method 900 is initialized at step 902 and proceeds to step 904, where the electronic assistant 100 receives a query from the user. The query refers to one or more items that may be on the user's computer. In one embodiment, the query is received in natural language form. For example the query may be "Find all email from Thierry about Project XYZ sent in the past week."

In step 906, the electronic assistant 100 runs the query over the harvested data. In one embodiment, the query is run against a Lucene Full Text Query (FTQ) over the harvested data. In this case, a Lucene query is first built from the original query.

In step 908, the electronic assistant receives one or more search results in response to the query. In one embodiment, the results are received in regular or semi-regular intervals (e.g., every x seconds). The results comprise items on the user's computer that match the query.

In step 910, the electronic assistant 100 tags each of the items contained in the search results. In one embodiment, the items are tagged using a tag associated with the query. The electronic assistant then stores the tags as metadata for the corresponding items (e.g., in a local database on the computer) in step 912. In one embodiment, a single tag can be associated with multiple queries. Conversely a single query can be associated with multiple tags. The method 900 then terminates in step 914.

In one embodiment, time-related queries (e.g., "email received today") are dynamically re-interpreted at regular, configurable intervals (e.g., during idle time). Based on the current time, a natural language engine provides an up to date interpretation of the query. If the interpretation has changed, an updated query (e.g., an updated Lucene query) is built to account for the new time requirements. Running this new query over the harvested data then returns any updated set of search results. For example, on Oct. 15, 2008, the query "email received today" will be interpreted as "email received 15 Oct. 08 12:00 AM-15 Oct. 08 11:59 PM," and a first set of emails will be returned. In the first hour of Oct. 16, 2008, the query will be re-interpreted as "email received 16 Oct. 08 12:00 AM-16 Oct. 08 11:59 PM," and a second set of emails will be returned.

In one embodiment, as queries are re-interpreted and different search results are returned, new matching items are automatically tagged, while items that matched the previous interpretation but no longer match the current interpretation are automatically untagged (e.g., the tag is removed from the associated metadata in the database). The database keeps a unique identifier for every item and for every tag, so that tag associations persist when a document is renamed or moved to a different location or when the tag itself is renamed or merged with another tag.

Tagged items are thus readily retrievable by searching on the tag metadata through natural language queries. For example, the query "email tagged as important" will return all items tagged with the tag "important;" and the query "files tagged as Calo modified last week" will return all items tagged with the tag "Calo."

The electronic assistant 100 can also learn a user's tagging behavior and gather information about tagged items as items are being tagged by the user (e.g., manually or via user-specified natural language queries). This "training" data is then used by the electronic assistant 100 to automatically propagate tags to other items and to predict and suggest new tag names to the user.

Figure 10:
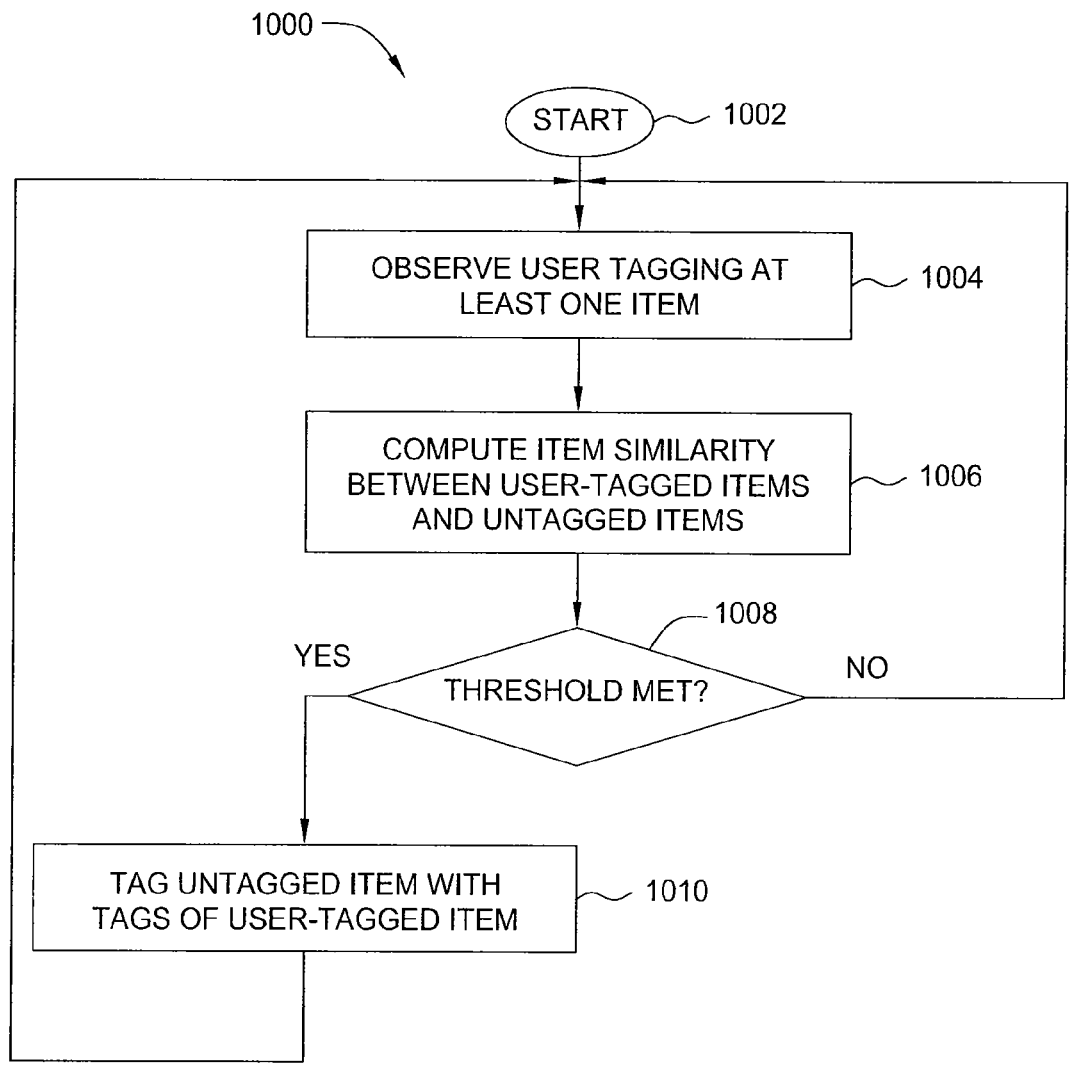
FIG. 10 is a flow diagram illustrating one embodiment of a method for learning tags, according to the present invention.

FIG. 10 is a flow diagram illustrating one embodiment of a method 1000 for learning tags, according to the present invention. Specifically, the method 1000 is implemented in order to learn how to tag items on a user's computer, based on the user's own tagging behavior. The method 1000 may be implemented, for example, by the electronic assistant 100 illustrated in FIG. 1. As such, reference is made in the discussion of FIG. 10 to various components of the electronic assistant 100; however, the method 1000 is not limited to operation with a device configured in the manner illustrated in FIG. 1.

The method 1000 is initialized in step 1002 and proceeds to step 1004, where the electronic assistant 100 observes the user tagging at least one item on the user's computer. In one embodiment, the items are tagged by the user manually, through use of a natural language query, or both manually and through the use of natural language queries.

In step 1006, the electronic assistant 100 computes the item similarity between each item tagged by the user and untagged items on the computer. The electronic assistant 100 then determines in step 1008 whether the item similarity between a given user-tagged item and a given untagged item meets or exceeds a predefined threshold.

If the electronic assistant 100 concludes in step 1008 that the item similarity at least meets the predefined threshold, then the electronic assistant 100 proceeds to step 1010 and tags the untagged item with the tags assigned to the user-tagged item. The method 1000 then returns to step 1004, and the electronic assistant 100 continues to observe the user tagging items. Alternatively, if the electronic assistant 100 concludes in step 1008 that the item similarity does not meet the predefined threshold, then the electronic assistant 100 returns directly to step 1004.

The method 1000 thereby allows a large number of items on a user's computer to be tagged from a small number of user-tagged items. This reduces the burden on the user to tag items on his or her computer. In one embodiment, tags that are learned in accordance with the method 1000 are uniquely identified by the electronic assistant's user interface, so that the user can differentiate between tags that he or she has personally created and tags that were automatically created.

In further embodiments, tags are propagated to folders. For example, tagging a single item in a folder causes other items in that folder that share a high degree of similarity to the tagged item to be tagged in the same way. In one embodiment, the similarity threshold used to propagate tags in this instance is lower than the similarity threshold used in step 1008 of the method 100, described above. This is because two items in the same folder are more likely to be similar than two randomly chosen items that may reside in different locations on the user's computer.

In a further embodiment still, the electronic assistant 100 accesses a dictionary of the most important words in all harvested items. This dictionary is dynamic and is constantly updated based on newly harvested items, on the user's interaction with these items (e.g., items that were recently edited), and on learning. For every item, the item's content (e.g., bag of words from the title and/or body) is analyzed, and a score (e.g., a term frequency-inverse document frequency (TF-IDF) score) is computed to find the most relevant words in the item which are also highly ranked in the dictionary. The items with the highest score are suggested to the user as possible tags for the item.

In still further embodiments, the electronic assistant 100 uses folder names to predict tags for items contained in the folders. Users often name folders (e.g., file or email folders) with the topic of all contents of the folder (e.g., "Project XYZ"). If a folder name matches a keyword that appears frequently in the items contained in the folder, the name of the folder is suggested as a tag for those items.

In some embodiments, the electronic assistant 100 also uses external sources (e.g., online encyclopedias or other services) to suggest tags. In such a case, the external source is run over all harvested items, and the tags are suggested based on the external source's topics that are related to the most frequent words contained in the harvested items.

As discussed above, harvesting and tagging items in this way allows for semantic searching of items on a user's computer. Often when a user is performing a search, he or she is not looking for a specific object, but for a quick answer to a question (e.g., "What is Steve's phone number?" or "Where is the location of John's retirement party?"). Generic searching does not handle such queries well, because the user may not know where on the computer the answer resides or what keywords are present in the item; as such, the user cannot tell the search engine where to look or what to look for. Alternatively, the user may know where the answer resides, but may want to obtain the answer quickly, without having to open the appropriate application.

For instance, if the user's query seeks to determine "Steve's phone number," the electronic assistant 100 might identify a plurality of locations in which the answer to the query might be found. For instance, the user may have received an email whose body contains "Steve's cell is (123) 456-7890;" there may be an entry in the user's contacts that is labeled "Steve" and includes a phone number; or Steve may have sent the user an email that includes a signature with a phone number. If the user's query seeks to determine "the location of John's retirement party," the answer might be found in a meeting labeled "retirement party" in the user's electronic scheduling application or in an email with the subject line of "retirement party" that includes an address in the body.

Semantic searching by the electronic assistant 100 thus benefits users who have a large amount of data and may not necessarily remember where they last viewed a certain piece of information. Semantic searching also saves time in scanning results, opening relevant applications, and navigating content.

Figure 11:
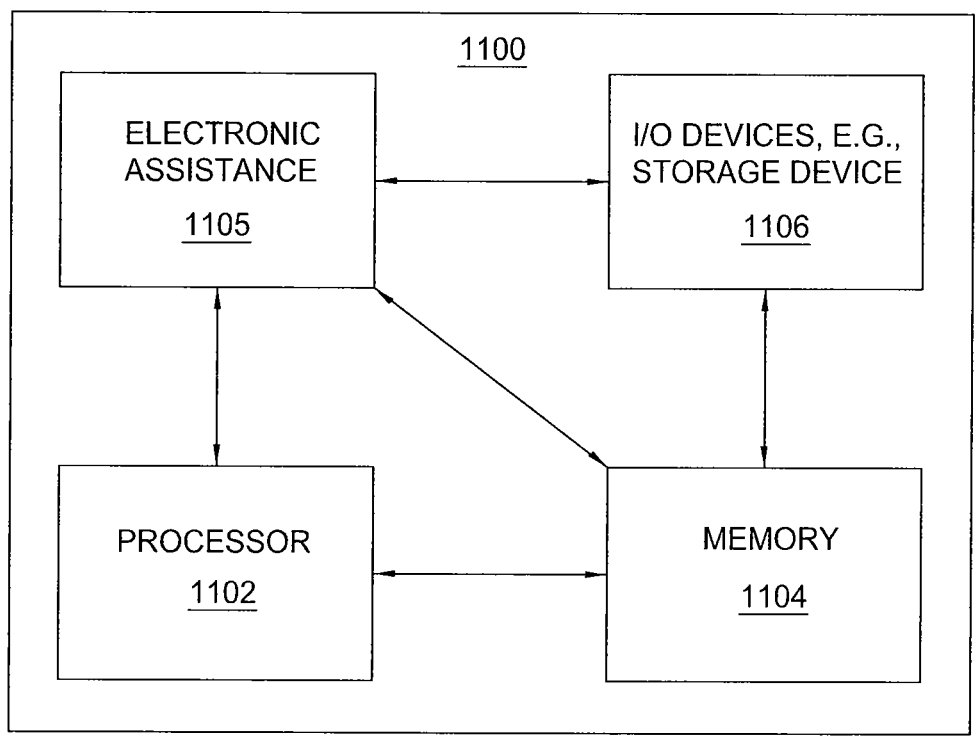
FIG. 11 is a high level block diagram of the present invention implemented using a general purpose computing device.

FIG. 11 is a high level block diagram of the present invention implemented using a general purpose computing device 1100. It should be understood that embodiments of the invention can be implemented as a physical device or subsystem that is coupled to a processor through a communication channel. Therefore, in one embodiment, a general purpose computing device 1100 comprises a processor 1102, a memory 1104, an electronic assistance module 1105, and various input/output (I/O) devices 1106 such as a display, a keyboard, a mouse, a modem, and the like. In one embodiment, at least one I/O device is a storage device (e.g., a disk drive, an optical disk drive, a floppy disk drive).

Alternatively, embodiments of the present invention (e.g., electronic assistance module 1105) can be represented by one or more software applications (or even a combination of software and hardware, e.g., using Application Specific Integrated Circuits (ASIC)), where the software is loaded from a storage medium (e.g., I/O devices 1106) and operated by the processor 1102 in the memory 1104 of the general purpose computing device 1100. Thus, in one embodiment, the electronic assistance module 1105 for processing incoming and outgoing email, generating contacts, tasks, and events, and performing searches described herein with reference to the preceding Figures can be stored on a computer readable medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present invention have been shown and described in detail herein, those skilled in the art can readily devise many other varied embodiments that still incorporate these teachings.

What is claimed is:

1. A natural language tagging system for processing electronic files on a user's computing system, wherein the natural language tagging system is embodied in one or more non-transitory computer accessible storage media and comprises instructions executable by a processor to:
    observe tagging of an electronic file by a user on the computing system, the user tagging producing a user-tagged electronic file;
    associate a user-created natural language query with a tag of the user-tagged electronic file, wherein the user-created natural language query is received via a user interface of the computing system and relates to a plurality of electronic files stored on the computing system;
    execute the natural language query on the plurality of electronic files stored on the computing system;
    compute a similarity between each of one or more untagged electronic files included in a search result for the executed natural language query;
    in an automated fashion, tag an untagged electronic file of the one or more untagged electronic files in the search result with a tag comprising at least a portion of the natural language query;
    wherein the natural language tagging system determines a folder name of a folder storing each of the one or more untagged electronic files on the computing system,
    wherein, in an automated fashion, the natural language tagging system propagates at least a portion of the folder name as a part of the tag for each of the one or more untagged electronic files stored in the folder, and
    wherein the system determines a frequent word contained in each of the one or more untagged electronic files stored in the folder and propagates the folder name as the part of the tag for the one or more untagged electronic files stored in the folder only if the folder name matches the frequent word.

2. A natural language tagging system for processing electronic files on a user's computing system, wherein the natural language tagging system is embodied in one or more non-transitory computer accessible storage media and comprises instructions executable by a processor to:
    observe tagging of an electronic file by a user on the computing system, the user tagging producing a user-tagged electronic file;
    associate a tag of the user-tagged electronic file with a user-created natural language query, wherein the user-created natural language query is received via a user interface of the computing system, the natural language query relating to a plurality of electronic files stored on the computing system;
    execute the natural language query on the plurality of electronic files stored on the computing system;
    compute a similarity between each of one or more untagged electronic files included in a search result for the executed natural language query;
    in an automated fashion, tag an untagged electronic file of the one or more untagged electronic files in the search result with a tag that comprises at least a portion of the natural language query;
    determine a frequent word contained in the particular untagged electronic file stored on the computing system,
    execute an external service using the frequent word as input to the external service, and
    suggest, as a part of the tag, for the particular untagged electronic file based on information returned by the external service in response to the executing of the external service with the frequent word as input.

3. An electronic assistant being embodied in one or more non-transitory computer accessible storage media and comprising instructions executable by a processor to tag a plurality of electronic files stored on a user's computing system by:
    observing tagging of an electronic file by the user on the computing system, the user tagging producing a user-tagged electronic file;
    associating a tag of the user-tagged electronic file with a user-created natural language query;
    computing a similarity between an untagged electronic file on the computing system and the user-tagged electronic file;
    in an automated fashion, tagging the untagged electronic file with the tag of the user-tagged electronic file in response to a determination that the computed similarity meets or exceeds a predefined threshold;
    harvesting the plurality of electronic files stored on the computing system;
    creating a dictionary of most important words contained in the plurality of harvested electronic files;
    receiving a new electronic file, wherein the new electronic file comprises the tag of the user-tagged electronic file;
    creating a bag of words model representing content of the new electronic file;
    computing a similarity score indicating a level of similarity of at least one word in the bag of words model to at least one word in the dictionary; and
    creating a new tag for the new electronic file, the new tag comprising a particular word of the bag of words model in response to the similarity score indicating a high level of similarity between the particular word of the bag of words model and the at least one word in the dictionary;
    periodically re-executin the computing of the similarity score and deleting the created tag of the new electronic file in response to the similarity score failing to indicate a high level of similarity between the at least one word in the bag of words model and the at least one word in the dictionary.

* * * * *